United States Patent [19]

Candlin et al.

[11] 4,136,057

[45] Jan. 23, 1979

[54] TRANSITION METAL COMPOSITION

[75] Inventors: John P. Candlin, Aston, near Stevenage; John A. A. G. Segal, London, both of England

[73] Assignee: Imperial Chemical Industries Limited, London, England

[21] Appl. No.: 822,909

[22] Filed: Aug. 8, 1977

[30] Foreign Application Priority Data

May 25, 1977 [GB] United Kingdom ............... 22044/77

[51] Int. Cl.$^2$ .......................... C08F 4/02; C08F 4/10; C08F 4/26
[52] U.S. Cl. .............................. 252/429 B; 252/431 R; 252/431 C; 252/431 N; 252/431 P; 526/113; 526/114; 526/123; 526/124; 526/125; 526/137; 526/139; 526/140; 526/141; 526/142; 526/143
[58] Field of Search ........... 252/429 B, 431 R, 431 C, 252/431 N, 431 P

[56] References Cited

U.S. PATENT DOCUMENTS

| | | | |
|---|---|---|---|
| 3,492,281 | 1/1970 | Smith et al. ................... | 252/429 B X |
| 3,494,873 | 2/1970 | Vohwinkel et al. ............. | 252/429 B |
| 3,558,515 | 1/1971 | Kittleman et al. ................ | 252/429 B |
| 3,642,746 | 2/1972 | Kashiwa et al. ................ | 252/429 B X |
| 3,738,944 | 6/1973 | Candlin et al. ............... | 252/429 B X |

Primary Examiner—Patrick Garvin
Attorney, Agent, or Firm—Cushman, Darby & Cushman

[57] ABSTRACT

A transition metal compound containing at least one $\eta^6$-arene is contacted with a solid material of the formula $MX_2nL$ where X is a halogen atom, n is such that $0 < n \leq 6$ and L is an organic Lewis Base compound. The transition metal compound can be a compound such as $TiCl_2 \cdot 2AlCl_3$-arene. The solid material is preferably of high surface area and this may be inherent in the solid material or can be achieved by a grinding procedure. The solid material may be $MgCl_2 2.0\ C_2H_5OH$; $MgCl_2 2.0\ CH_3COOH$ or $MgCl_2 1.0\ CH_3COOC_2H_5$. The solid material can be treated with a halogen-containing compound either before, during or after the contacting with the transition metal compound. The product of the contacting is useful either as catalyst for the polymerization of unsaturated hydrocarbon monomers or as a component of such a catalyst. When used as a component of an olefine polymerization catalyst, the transition metal product can be mixed with an organo-aluminium compound and and additional Lewis Base compound such as an ester. The catalyst can be used to polymerize or copolymerize olefine monomers to obtain a high yield of a polymer.

7 Claims, No Drawings

TRANSITION METAL COMPOSITION

The present invention relates to the treatment of compounds of transition metals and to the use of the treated compounds as components of catalysts for the polymerization of ethylenically unsaturated hydrocarbon monomers.

According to the present invention a compound of a transition metal of Groups IVA or VA of the Periodic Table, which compound contains at least one $\eta 6$-arene group, is contacted with a solid particulate material which consists essentially of at least one compound having the general formula $MX_2nL$ wherein:

M is a metal which is present in the divalent form;
X is a halogen atom excluding fluorine;
n is a number such that $0<n\leq 6$; and
L is an organic Lewis Base compound.

The proportions of the two materials which are used may be varied considerably and a molar excess of either material may be used, for example from 0.01 up to 100 moles, especially from 0.1 up to 10 moles, of the transition metal compound for each mole of the compound $MX_2nL$. Conveniently the proportions used may be from 0.15n up to 1.5n moles of the transition metal compound for each mole of the compound $MX_2nL$.

The transition metal is preferably a metal of Group IVA and is particularly titanium. The transition metal compound may contain only the $\eta 6$-arene group, or may also contain other groupings such as halogen atoms, and the compound may be in the form of a complex with other compounds. In the transition metal compound the valency of the metal may be zero or any valency wherein the transition metal is able to form a stable compound containing at least one $\eta 6$-arene group. Thus, the transition metal compound may be titanium (O) ditoluene. Useful effects have been obtained using, as the transition metal compound, a titanium dichloride-aluminum chloride-arene complex compound where the arene group is any suitable arene for example durene (1,2,4,5-tetramethylbenzene), benzene or toluene. The term "arene" as used herein is used to mean a compound containing a six-membered hydrocarbyl ring which ring contains a completely delocalized double-bond system. It will be appreciated that the term arene as used includes not only benzene, toluene and durene, but also xylene, hexamethylbenzene and substituted derivatives thereof such as chlorobenzene.

The solid particulate material conveniently has a high surface area and it will be appreciated that some materials of this type inherently have such a high surface area whereas with other materials it is necessary to grind, or otherwise comminute, the solid particulate material in order to achieve a satisfactorily high surface area. It is preferred that the surface area of the solid particulate material is at least 1 $m^2/g$ and it is particularly preferred that the area is at least 10 $m^2/g$ and especially 30 $m^2/g$.

The metal M is a metal which is present in the divalent form and it will be appreciated that such metals include not only metals such as magnesium, which exist predominantly in the divalent form, but also metals such as manganese which are capable of existing in several valency states including the divalent state. It is preferred that M is magnesium. The halogen X is conveniently chlorine.

The number n is preferably an integer of from 1 up to 6 but it will be appreciated that if the solid particulate material contains more than one compound which differ in the number of molecules of the organic Lewis Base compound present, then n need not be an integer but may have an intermediate value depending on the relative proportions of the various compounds forming the solid particulate material.

The organic Lewis Base compound L is a compound containing at least one donor atom which has one, or more, pairs of electrons capable of effecting co-ordination with the metal M. The organic Lewis Base compound L is preferably one in which the donor atom is a phosphorus, nitrogen, sulphur or oxygen atom. Thus, the organic Lewis Base compound may be an ether; an ester; a ketone; an alcohol; a sulphur-containing analogue of ethers, esters, ketones and alcohols; a sulphone; a sulphonamide; a fused ring compound containing a heterocyclic sulphur atom; an organo-silicon compound; an amide; urea or thiourea; an amine, which term is used to include alkanolamines, cyclic amines and diamines; or an organo-phosphorus compound such as an organo-phosphine, an organo-phosphine oxide, an organo-phosphite or an organo-phosphate. The use of organic Lewis Base compounds is disclosed inter alia in British patent specifications Nos. 803 198, 809 717, 880 998, 896 509, 920 118, 921 954, 933 236, 940 125, 966 025, 969 074, 971 248, 1 013 363, 1 017 977, 1 049 723, 1 122 010, 1 150 845, 1 208 815, 1 234 657, 1 324 173, 1 359 328, 1 383, 207, 1 423 658, 1 423 659 and 1 423 660 and Belgian patent specification No. 693 551. Suitable sulphones, sulphonamides and fused ring compounds containing a heterocyclic sulphur atom are disclosed in published German patent application No. 2 600 552.

The solid particulate material may be $MgCl_2 2.0$ $C_2H_5OH$, $MgCl_2 2.0$ $CH_3COOH$, $MgCl_2 0.5$ $CH_3OC_6H_4COOC_2H_5$, $MgCl_2 1.0$ $CH_3COOC_2H_5$, $MgCl_2 1.0$ $CH_3OC_6H_5$ but it will be appreciated that many other materials may be used as the solid particulate material.

The compound $MX_2nL$ which forms the solid particulate material is typically a compound which is insoluble in hydrocarbon liquids.

The compound of the formula $MX_2nL$ is readily prepared by the reaction between $MX_2$ and an appropriate quantity of the organic Lewis Base compound L. The reaction is conveniently effected by reacting solid $MX_2$ with a liquid medium which is a solution of the organic Lewis Base compound or may be a liquid organic Lewis Base compound. The reaction may be effected by grinding together solid $MX_2$ and the organic Lewis Base compound. Alternatively, the solid $MX_2$ may be reacted with an excess quantity of liquid organic Lewis Base compound to form a solution of the compound $MX_2nL$ in the liquid organic Lewis Base compound, separating the solid $MX_2nL$ for example by crystallisation or by precipitation of the compound $MX_2nL$, such precipitation being effected by the addition of a liquid which is a non-solvent for $MX_2nL$, such as an aliphatic or aromatic hydrocarbon. The separated $MX_2nL$ is then preferably washed and finally dried under reduced pressure to remove any quantity of the organic Lewis Base compound which is in excess of that required in the desired compound $MX_2nL$. The compound $MX_2nL$ may be obtained by dissolving a precursor of the halide, such as an alkyl compound, in an organic Lewis Base compound and treating the solution with a halogenating agent such as hydrogen chloride which causes the formation and precipitation of a compound $MX_2nL$ which may be washed and dried in the manner described previously.

Before, during or after the contacting of the solid particulate material with the transition metal compound, the solid particulate material may also be treated with a halogen-containing compound which may be either an organic or inorganic compound. Suitable halogen-containing compounds include hydrogen chloride, titanium tetrachloride and toluoyl chloride. The amount of the halogen-containing compound which is used is preferably at least 0.10 moles per g atom of transition metal which is present in the transition metal compound, and is very preferably at least 0.5 moles per g atom of the transition metal compound. Very conveniently a molar excess of the halogen-containing compound is used and any excess of the halogen-containing compound which remains after completion of the treatment may be removed using any suitable technique such as filtration and/or washing with an inert liquid.

The contacting of the transition metal compound with the solid particulate material is conveniently effected by contacting the solid particulate material with a solution of the transition metal compound in a hyrocarbon or other inert diluent. The contacting may be effected by stirring a suspension of the solid particulate material in a suitable inert diluent with a solution of the transition metal compound, or may be effected by grinding the solid particulate material in the presence of the transition metal compound, which may, if desired, be in solution in a suitable inert liquid. However, it will be appreciated that the solid particulate material may be subjected to a grinding step either before or after it has been contacted with the transition metal compound, and it is not necessary to effect grinding of the solid particulate material in the presence of the transition metal compound.

The contacting of the transition metal compound with the solid particulate material may be effected at any suitable temperature but, since some of the transition metal compounds are thermally unstable, when using such compounds it is preferred to use temperatures of ambient temperature or below. The solvent used for the dissolution of the transition metal compound may be any suitable inert liquid and is conveniently an aromatic liquid since many of the transition metal compounds have a greater solubility in such diluents.

If the solid particulate material is subjected to a grinding step, this can be effected in any known manner for example in a rotating ball mill or in a vibrating ball mill. The time of grinding will be dependent on a number of factors including the nature of the material to be ground, the particle size desired in the ground product and the intensity of the grinding. In general a time of from 1 hour up to 100 hours is sufficient to effect the requisite comminution of the solid particulate material. The milling can be effected at any desired temperature which conveniently may be ambient temperature, but a lower temperature may be used if the grinding is being effected in the presence of a thermally unstable transition metal compound.

Although some of the transition metal compounds are thermally unstable and have to be stored at a low temperature, the product of contacting the transition metal compound with the solid particulate material has improved stability and can be stored at ambient temperature without appreciable deterioration. Thus, the product of contacting the transition metal compound with the solid particulate material can be stored as a dry solid or as a suspension in a suitable inert liquid.

The product of contacting the transition metal compound with the solid particulate material can be used, either alone or together with other compounds such as the organic compound or a non-transition metal of Groups IA and IIA or of aluminum, to polymerize ethylenically unsaturated hydrocarbon monomers.

Thus, as a further aspect of the present invention there is provided a catalyst suitable for the polymerization of ethylenically unsaturated hydrocarbon monomers, which catalyst contains a transition metal component which is the product of contacting a transition metal compound of a metal of Groups IVA or VA of the Periodic Table, which compound contains at least one $\eta^6$-arene, with a solid particulate material which consists essentially of at least one compound having the general formula $MX_2nL$ where L, M, X and n are all as hereinbefore defined.

The catalyst may be a single component catalyst system which consists solely of the transition metal component but the catalyst may include, as a second component, at least one organo-metallic compound of aluminium or of a non-transition metal of Group IIA of the Period Table or a complex of an organo-metallic compound of a non-transition metal of Group IA or IIA of the Periodic Table an an organo-aluminum compound.

The second component of the catalyst system can be Grignard reagent which is substantially ether free or a compound of the type $Mg(C_6H_5)_2$. Alternatively, the second component can be a complex of an organo-metallic compound of a non-transition metal of Groups IA or IIA with an organo-aluminium compound for example $Mg[Al(C_2H_5)_4]_2$ or lithium aluminium tetraalkyl. It is preferred that the second component is an organoaluminum compound such as a bis(dialkyl aluminum-)oxyalkane, a bis(dialkyl aluminum)oxide, an aluminum hydrocarbyl sulphate, an aluminum hydrocarbyloxyhydrocarbyl or particularly an aluminum trihydrocarbyl or dihydrocarbyl aluminum halide or hydride. We particularly prefer to use either an aluminum trialkyl such as aluminum triethyl or an aluminum dialkyl halide such as diethyl aluminum chloride. We particularly prefer that the second component is a halogen-free material for example an aluminum trialkyl.

In addition to the first and second components, the catalyst may also contain other components for example organic Lewis Base compounds. The organic Lewis Base compound may be the same as, or different from, the organic Lewis Base compound L which is present in the compound $MX_2nL$. Thus, the organic Lewis Base compound which may be used as a possible third component of the catalyst may be any Lewis Base compound of the type previously described. The Lewis Base compound may be incorporated into the catalyst system as a complex with the organo-metallic component of the catalyst. Suitable complexes of the organic Lewis Base compound and the organo-metallic compound include complexes of aluminum trialkyl with esters and in particular with aromatic esters such as ethyl benzoate or ethyl anisate.

In addition to or instead of the organic Lewis Base compound the catalyst may also contain a substituted or unsubstituted polyene. The polyene may be an acyclic polyene such as 3-methylheptatriene-1,4,6 or a cyclic polyene such as cyclooctatriene, cyclo-octatetraene or cycloheptatriene or may be a derivative of such cyclic polyenes for example the alkyl- or alkoxy-substituted polyenes, tropylium salts or complexes, tropolone or tropone.

The proportions of the catalyst components can be varied quite widely depending on the particular materials used and the absolute concentrations of the components. The proportions will also be dependent on the monomer which is to be polymerized. However, if the catalyst system includes components in addition to the transition metal component, then these may be present in the conventional proportions for Ziegler catalyst system. More specifically, for each gram atom of the transition metal which is present in the product of contacting the transition metal compound with the solid particulate material, there should be present at least 0.05 and preferably at least 1 mole of the organo-metallic compound which is the second component of the catalyst. However, in general it is preferred to use larger quantities of the organo-metallic component and the proportion of this compound may be as high as 100 moles for each gramme atom of the transition metal compound. However, in general we prefer to use smaller proportions of the organo-metallic compounds, for example not more than 25, and particularly not more than 10 moles, of the second component for each gram atom of the transition metal. If a Lewis Base component is also present in the catalyst system, the number of moles of the Lewis Base compound should not be greater than the number of moles of the organo-metallic compound which is the second component of the catalyst. If the catalyst includes a polyene, then the molar proportion of the polyene is preferably less than the molar proportion of the second component. Preferably for each mole of the second component there is present from 0.05 up to 0.5 particularly from 0.1 up to 0.2 moles of the polyene.

The catalyst of the present invention can be used to polymerize ethylenically unsaturated hydrocarbon monomers by contacting at least one such monomer with a catalyst of the type hereinbefore described.

More specifically there is provided a process for the production of a hydrocarbon polymer wherein at least one ethylenically unsaturated hydrocarbon monomer is contacted with a polymerization catalyst of the type hereinbefore described.

The ethylenically unsaturated hydrocarbon monomer may be a mono-olefine and may be any which is capable of being polymerized using a Ziegler catalyst system. Thus, monomers which can be polymerized by the process of the present invention may be mono-olefines containing up to 18 carbon atoms, for example butene-1 and 4-methylpentene-1 and particularly ethylene and propylene. If desired the olefines, particularly ethylene and propylene, may be copolymerized together for example using a sequential polymerization technique such as is described in British patent specifications Nos. 970 478, 970 479 and 1 014 944. The monomer may, alternatively, be a diene or polyene such as, for example, butadiene.

The type of catalyst for the polymerization will be dependent on monomer being polymerized. If ethylene or a mixture containing ethylene is to be polymerized, the catalyst can consist solely of the product of contacting the transition metal compound with the solid particulate material. However, if the monomer to be polymerized is propylene or a higher olefine, that is one containing 4 or more carbon atoms, it is preferred that the catalyst system includes a second component which is an organo-metallic compound of aluminum or of a non-transition metal of Group IIA of the Periodic Table, or a complex of a non-transition metal of Group IA or IIA of the Periodic Table and an organo-aluminum compound. For the polymerization of propylene and higher olefines, it is particularly preferred that the catalyst system also includes an organo-Lewis Base compound.

We have found that the process of the present invention can be used to obtain a high yield of a polymer relative to the amount of the catalyst used. If the polymer being polymerized is propylene, or a higher olefine, then, if the preferred catalyst systems are used, a relatively low proportion of the undesirable soluble polymer may also be obtained.

It is preferred to use monomers (and diluents when required) which have a high degree of purity, for example a monomer containing less than 5 ppm by weight of water and less than 1 ppm by weight of oxygen. Materials having a high degree of purity can be obtained by processes such as those described in British patent specifications Nos. 1 111 493, 1 226 659 and 1 383 611.

Polymerization can be carried out in known manner, for example in the presence or absence of an inert diluent such as a suitably purified paraffinic hydrocarbon, in the liquid phase using excess liquid monomer or in the gaseous phase.

Polymerization may be effected either in a batch manner or on a continuous basis and the catalyst components may be introduced into the polymerization vessel separately or all the catalyst components may be mixed together before being introduced into the polymerization reactor.

The polymerization can be effected in the presence of a chain transfer agent such as hydrogen or a zinc dialkyl, in order to control the molecular weight of the product formed. If hydrogen is used as the chain transfer agent, it is conveniently used in an amount of from 0.01 up to 5.0%, particularly from 0.10 up to 2.0%, molar relative to the monomer. The amount of chain transfer agent will be dependent on the polymerization conditions, especially the temperature, which is typically in the range from 20° C. up to 100° C., preferably from 50° C. up to 85° C.

Various aspects of the present invention will now be described with reference to the following Examples which are illustrative of the invention. In the Examples, all operations were effected under an atmosphere of nitrogen unless otherwise indicated.

(A) Preparation of titanium dichloride-aluminum chloride-benzene complex 51 grams of aluminum powder (BDH fine powder) and 80 grams of anhydrous aluminum chloride were introduced into a 2 liter, three-necked flask and the mixture of solids was heated at 130° C. for 0.5 hours. The mixture was then allowed to cool. 500 ml of benzene was added and then 33.3 grams of titanium tetrachloride was added with stirring. The mixture was refluxed for 20 hours and then allowed to cool. The cool solution was filtered into 1 liter of heptane, and this mixture was cooled to −10° C. and maintained at this temperature for 24 hours. The supernatant liquid was decanted from the purple solid which had been formed. The solid was washed four times using 1 liter of heptane for each wash, and then was dried under reduced pressure (1 mm mercury) at ambient temperature.

(B) Preparation of MgCl$_2$2.0 C$_2$H$_5$OH 1.2 grams of anhydrous magnesium chloride (supplied by BDH) were suspended in 100 ml of toluene in a 500 ml flask. 0.91 ml of dry ethanol was added with vigorous stirring which was continued for 2 hours at ambient temperature.

EXAMPLE 1

30 ml of a solution, in benzene, of the product of Preparation A which contained 12.6 mM of this product was added, at ambient temperature, to the suspension obtained in Preparation B. A black precipitate was formed immediately. This was allowed to settle and the supernatant liquid was decanted off. The solid was washed five times using 200 ml of toluine for each wash and finally resuspended in 200 ml of heptane.

A titration with ceric sulphate showed the suspension to contain 6.2 mM of reduced titanium.

EXAMPLE 2

10 ml of the heptane suspension of Example 1 (which contained 0.31 mM of reduced titanium) was added to a two liter flask containing 1 liter of dry heptane saturated with ethylene at 25° C. 8 ml of a 1 M solution of aluminum triethyl in heptane was then added to the contents of the flask which were being stirred. Ethylene was then admitted to the flask at a rate sufficient to maintain the pressure at atmospheric pressure. After 2.5 hours, 30 ml of isopropanol was added and the mixture was filtered. A yield of 15.9 grams of polyethylene was obtained, which was dried in an air oven at 80° C.

EXAMPLE 3

The procedure of Example 2 was repeated using 100 ml of the heptane suspension of Example 1 (which contained 3.1 mM of reduced titanium), propylene as the monomer and a polymerization time of 2.0 hours. A total yield of 74.5 grams of polypropylene was obtained of which 36.6 grams (about 49%) was dissolved in the polymerization diluent.

We claim:

1. A process which comprises contacting a compound of a transition metal of Group IVA or VA of the Periodic Table with a solid particulate material, wherein the compound of the transition metal contains at least one $\eta^6$-arene group and is selected from compounds containing only the transition metal and the $\eta^6$-arene group or groups and titanium dichloride-aluminum chloride-arene complex compounds and the solid particulate material consists essentially of at least one compound having the general formula MX$_2$nL wherein:

M is a metal which is present in the divalent form selected from magnesium and manganese;
X is a halogen atom excluding fluorine;
n is a number such that $0 < n \leq 6$; and
L is an organic Lewis Base compound which is a hydrocarbyl compound containing at least one donor atom which has one, or more, pairs of electrons capable of effecting co-ordination with the metal M, the said donor atom, or atoms, being phosphorus, nitrogen, sulphur or oxygen atoms.

2. The process of claim 1, wherein the solid particulate material is treated with an organic or inorganic halogen-containing compound selected from hydrogen chloride, titanium tetrachloride and toluoyl chloride, before, during or after the solid particulate material has been contacted with the transition metal compound, said treatment being effected by contacting with the said halogen-containing compound at a temperature not exceeding ambient temperature.

3. The product of contacting a compound of a transition metal of Group IVA or VA of the Periodic Table with a solid paticulate material, wherein the compound of the transition metal contains at least one $\eta^6$-arene group and is selected from compounds containing only the transition metal and the $\eta^6$-arene group or groups and titanium dichloride-aluminum chloride-arene complex compounds and the solid particulate material consists essentially of at least one compound having the general formula MX$_2$nL wherein:

M is a metal which is present in the divalent form selected from magnesium and manganese;
X is a halogen atom excluding fluorine;
n is a number such that $0 < n \leq 6$; and
L is an organic Lewis Base compound which is a hydrocarbyl compound containing at least one donor atom which has one, or more, pairs of electrons capable of effecting coordination with the metal M, the said donor atom, or atoms, being phosphorus, nitrogen, sulphur or oxygen atoms.

4. In a catalyst for the polymerization of ethylenically unsaturated hydrocarbon monomers which catalyst comprises a compound of a transition metal and at least one organo-metallic compound of aluminium, or of a non-transition metal of Group IIA of the Periodic Table, or a complex of an organo-metallic compound of a non-transition metal of Group IA or IIA of the Periodic Table and an organo-aluminium compound, the improvement which comprises using the product of claim 3 as the compound of a transition metal.

5. The process of claim 1 wherein from 0.01 up to 100 moles, of the transition metal compound are contacted with each mole of the compound MX$_2$nL.

6. The process of claim 1 wherein the solid particulate material is MgCl$_2$2.0 C$_2$H$_5$OH; MgCl$_2$2.0 CH$_3$COOH; MgCl$_2$0.5 CH$_3$OC$_6$Hhd 4COOC$_2$H$_5$; MgCl$_2$1.0 CH$_3$COOC$_2$H$_5$ or MgCl$_2$1.0 CH$_3$OC$_6$H$_5$.

7. The process of claim 1 wherein the solid particulate material is contacted with a solution of the transition metal compound in a hydrocarbon or other inert diluent.

* * * * *

UNITED STATES PATENT OFFICE
CERTIFICATE OF CORRECTION

Patent No. 4,136,057          Dated Jan. 23, 1979

Inventor(s) John P. Candlin, and John A.A.A.G. Segal

It is certified that error appears in the above-identified patent and that said Letters Patent are hereby corrected as shown below:

<u>IN THE CLAIMS</u>:

Claim 6, column 8, line 51, an error appears in the formula and should be rewritten to read:

--$CH_3COOH$; $MgCl_2 0.5$ $CH_3OC_6H_4COOC_2H_5$;--.

Signed and Sealed this

Thirteenth Day of January 1981

[SEAL]

Attest:

SIDNEY A. DIAMOND

Attesting Officer      Commissioner of Patents and Trademarks